(12) United States Patent
Kishioka

(10) Patent No.: US 8,088,864 B2
(45) Date of Patent: Jan. 3, 2012

(54) PRESSURE-SENSITIVE ADHESIVE COMPOSITION, AND PRESSURE-SENSITIVE ADHESIVE PRODUCT AND DISPLAY USING THE SAME

(75) Inventor: Hiroaki Kishioka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 420 days.

(21) Appl. No.: 12/116,252

(22) Filed: May 7, 2008

(65) Prior Publication Data

US 2008/0281047 A1   Nov. 13, 2008

(30) Foreign Application Priority Data

May 8, 2007   (JP) ................................. 2007-123918

(51) Int. Cl.
  *C08L 83/00*   (2006.01)
(52) U.S. Cl. ........................................ 525/101; 525/102
(58) Field of Classification Search .................. 525/101, 525/102

See application file for complete search history.

(56) References Cited

U.S. PATENT DOCUMENTS

| | | | | |
|---|---|---|---|---|
| 6,451,156 | B2 * | 9/2002 | Kishioka et al. ............. | 156/329 |
| 6,939,911 | B2 * | 9/2005 | Tosaki et al. ................ | 524/522 |
| 2005/0014879 | A1 * | 1/2005 | Moroishi et al. ............. | 524/261 |
| 2006/0223938 | A1 | 10/2006 | Nagamoto et al. | |

FOREIGN PATENT DOCUMENTS

| | | |
|---|---|---|
| JP | 1-178567 A | 7/1989 |
| JP | 7-3221 A | 1/1995 |
| JP | 10-310754 A | 11/1998 |
| JP | 2001-89731 A | 4/2001 |
| JP | 2004-263165 A | 9/2004 |
| JP | 2005-15524 A | 1/2005 |
| JP | 2005-255877 A | 9/2005 |

OTHER PUBLICATIONS

Extended European Search Report dated Nov. 4, 2008.

* cited by examiner

*Primary Examiner* — Margaret Moore
(74) *Attorney, Agent, or Firm* — Sughrue Mion, PLLC

(57) ABSTRACT

The present invention provides a pressure-sensitive adhesive composition comprising an acrylic polymer (a), an acrylic oligomer (b), a silane coupling agent having an amino group, and a cross-linking agent, the acrylic polymer (a) containing, as a main monomer component, at least one of a (meth)acrylic acid alkyl ester containing an alkyl group having a number of carbons of from 4 to 12 and a (meth)acrylic acid alkoxyalkyl ester, and containing 1 to 10 parts by weight of a carboxyl group-containing monomer as a monomer component based on 100 parts by weight of the total monomer components constituting the acrylic polymer (a), the acrylic polymer (a) having a weight-average molecular weight of from 400,000 to 1,500,000; and the acrylic oligomer (b) containing a (meth) acrylic acid ester as a main monomer component, and containing 1 to 10 parts by weight of a carboxyl group-containing monomer as a monomer component based on 100 parts by weight of the total monomer components constituting the acrylic oligomer (b), the acrylic oligomer (b) having a weight-average molecular weight of 3,000 or more but less than 6,000, in which the pressure-sensitive adhesive composition contains 10 to 35 parts by weight of the acrylic oligomer (b) and 0.01 part by weight or more but less than 1.0 part by weight of the silane coupling agent having an amino group, based on 100 parts by weight of the acrylic polymer (a). The pressure-sensitive adhesive composition is excellent in transparency and foaming and separation resistances, does not cause periodical reduction of adhesiveness and dramatically improves adhesion reliability.

9 Claims, No Drawings

PRESSURE-SENSITIVE ADHESIVE COMPOSITION, AND PRESSURE-SENSITIVE ADHESIVE PRODUCT AND DISPLAY USING THE SAME

FIELD OF THE INVENTION

The present invention relates to an acrylic pressure-sensitive adhesive composition. Particularly, it relates to a pressure-sensitive adhesive composition which is excellent in the adhesiveness, foaming and separation resistances and transparency with respect to glass and acrylic, polycarbonate, polyethylene terephthalate and the like transparent plastics and is particularly excellent in the adhesiveness with respect to glass under a humidified condition. The present invention also relates to a pressure-sensitive adhesive product applied with the pressure-sensitive adhesive composition and a display obtained by laminating the pressure-sensitive adhesive product.

BACKGROUND OF THE INVENTION

In recent years, FPD (flat panel display) such as a liquid crystal display (LCD) has been broadly used. FPD is produced by laminating optical films having various functions through a pressure-sensitive adhesive. In such applications, excellent reliabilities such as the properties of causing no foaming or separation under high temperature and high humidity conditions (foaming and separation resistances), as well as the adhesiveness and transparency, are required for the pressure-sensitive adhesive.

As the method for improving such characteristics, adjustment of the molecular weight of acrylic polymers (see, for example, JP-A-1-178567), copolymerization of modified monomers and the like have been known. In addition, for the purpose of improving adhesiveness to plastics, a method for improving foaming and separation resistances by adding an additive agent such as a tackifier, and the like have been known. However, these methods are not sufficient in terms of the characteristics of foaming and separation resistances under high temperature and high humidity environment.

Further, a pressure-sensitive adhesive composition and a pressure-sensitive adhesive tape, which are excellent in transparency and separation resistance for plastics and prepared by blending a specific oligomer with a specific acrylic polymer, have been known (see, for example, JP-A-2005-15524 and JP-A-2005-255877). However, these have a problem in that their adhesiveness for glass under a humidified condition is insufficient.

In addition, there has been known a pressure-sensitive adhesive composition having excellent transparency, foaming resistance and adhesive property, which contains a polymer containing a carboxyl group-containing monomer as a constituent component and a polymer containing an amino group-containing monomer as a constituent component (see, Japanese Patent No. 3516035). Further, there has been known a pressure-sensitive adhesive composition which is prepared by mixing a (meth)acrylic acid ester polymer (A) having a weight-average molecular weight of from 500,000 to 2,500,000 and a (meth)acrylic acid ester polymer (B) having a weight-average molecular weight of from 5,000 to 500,000 at a specific weight ratio, wherein either one of the polymers (A) and (B) has a nitrogen-containing functional group (see, JP-A-2001-89731). However, in order to improve adhesiveness with glass, it is necessary to contain a large amount of the polymer (B) in this pressure-sensitive adhesive composition, which poses a problem as the yellowing caused by amine.

On the other hand, a method in which a silane coupling agent is added to an acrylic pressure-sensitive adhesive has been known as a method for improving adhesiveness for glass (see, for example, JP-A-7-3221). However, since the preservation stability of the silane coupling agent is poor in such a system, hydrolysis as well as dimerization and trimerization of the silane coupling agent progress when preserved for a prolonged period of time, thus posing a problem of reducing adhesiveness for glass.

In addition, there has been known a pressure-sensitive adhesive composition for optical member use, which contains two carboxyl group-containing acrylic polymers having different weight-average molecular weights, a silane coupling agent and a cross-linking agent (see, JP-A-2004-263165). However, this composition has a problem in that it is insufficient in terms of the foaming and separation resistances with respect to plastics.

SUMMARY OF THE INVENTION

An object of the invention is to provide a pressure-sensitive adhesive composition which is not only excellent in transparency and foaming and separation resistances but also can maintain adhesiveness with respect to glass even when preserved for a prolonged period of time. Another object of the invention is to provide a pressure-sensitive adhesive product and a display, which employ the same and has high reliability.

With the aim of achieving the above-mentioned objects, the present inventors have conducted intensive studies and found as a result that a pressure-sensitive adhesive composition containing an acrylic polymer and an acrylic oligomer each having a specified molecular weight and a specified composition in addition to a cross-linking agent and a silane coupling agent, in which a blending amount of the silane coupling agent is controlled within a specified range, is excellent in the transparency and foaming and separation resistances and is also excellent in the preservation stability when preserved for a prolonged period of time, thereby accomplishing the invention.

Namely, the present invention relates to the following items 1 to 9.

1. A pressure-sensitive adhesive composition comprising an acrylic polymer (a), an acrylic oligomer (b), a silane coupling agent having an amino group, and a cross-linking agent, said acrylic polymer (a) containing, as a main monomer component, at least one of a (meth)acrylic acid alkyl ester containing an alkyl group having a number of carbons of from 4 to 12 and a (meth)acrylic acid alkoxyalkyl ester, and containing 1 to 10 parts by weight of a carboxyl group-containing monomer as a monomer component based on 100 parts by weight of the total monomer components constituting the acrylic polymer (a), the acrylic polymer (a) having a weight-average molecular weight of from 400,000 to 1,500,000; and said acrylic oligomer (b) containing a (meth)acrylic acid ester as a main monomer component, and containing 1 to 10 parts by weight of a carboxyl group-containing monomer as a monomer component based on 100 parts by weight of the total monomer components constituting the acrylic oligomer (b), the acrylic oligomer (b) having a weight-average molecular weight of from 3,000 or more but less than 6,000, wherein the pressure-sensitive adhesive composition contains 10 to 35 parts by weight of the acrylic oligomer (b) and 0.01 part by weight or more but less than 1.0 part by weight of the silane coupling agent having an amino group, based on 100 parts by weight of the acrylic polymer (a).

2. The pressure-sensitive adhesive composition according to item 1, wherein said at least one of the (meth)acrylic acid alkyl ester and the (meth)acrylic acid alkoxyalkyl ester in the acrylic polymer (a) are contained in a proportion of 50% by weight or more based on the total monomer components constituting the acrylic polymer (a).

3. The pressure-sensitive adhesive composition according to item 1, wherein the (meth)acrylic acid ester in the acrylic oligomer (b) is contained in a proportion of 50% by weight or more based on the total monomer components constituting the acrylic oligomer (b).

4. The pressure-sensitive adhesive composition according to item 1, wherein the (meth)acrylic acid ester as the main monomer component constituting the acrylic oligomer (b) is a (meth)acrylic acid showing a glass transition temperature of from 60 to 190° C. when it is formed into a homopolymer.

5. The pressure-sensitive adhesive composition according to item 1, wherein the (meth)acrylic acid ester as the main monomer component constituting the acrylic system oligomer (b) is a (meth)acrylic acid ester having a ring structure.

6. The pressure-sensitive adhesive composition according to item 1, wherein the silane coupling agent has a secondary amine.

7. A pressure-sensitive adhesive product applied with the pressure-sensitive adhesive composition according to item 1.

8. The pressure-sensitive adhesive product according to item 7, wherein the pressure-sensitive adhesive composition is applied onto a base material or a release liner to form a pressure-sensitive adhesive layer.

9. A display obtained by laminating the pressure-sensitive adhesive product according to item 7 on a glass.

According to the pressure-sensitive adhesive composition of the invention, since it is excellent in transparency and foaming and separation resistances owing to its possession of the aforementioned construction, when it is used for the adhesion of optical members to be used in FPD, visibility and the like optical characteristics of these products can be improved. In addition, since there is no periodical reduction of adhesiveness, reliability may be dramatically improved.

DETAILED DESCRIPTION OF THE INVENTION

The pressure-sensitive adhesive composition of the invention contains an acrylic polymer (a), an acrylic oligomer (b), a silane coupling agent having an amino group and a crosslinking agent as the essential components.

Acrylic Polymer (a)

The acrylic polymer (a) to be used in the pressure-sensitive adhesive composition of the invention is a polymer containing, as a main monomer component, at least one of a (meth)acrylic acid alkyl ester containing an alkyl group having a number of carbons of from 4 to 12 (to be referred sometimes to as "(meth)acrylic acid $C_{4-12}$ alkyl ester" hereinafter) and a (meth)acrylic acid alkoxyalkyl ester. Furthermore, in addition to the above-mentioned main monomer component, the acrylic polymer (a) contains a carboxyl group-containing monomer as an essential copolymerization monomer component. In addition, other monomer components may be further used according to the necessity. In this connection, in whole the present specification, "(meth)acrylic" means "acrylic" and/or "methacrylic".

The above-mentioned (meth)acrylic acid $C_{4-12}$ alkyl ester is not particularly limited so long as it is a (meth)acrylic acid alkyl ester wherein the number of carbons of the alkyl group is from 4 to 12, and examples thereof include n-butyl (meth)acrylate, isobutyl(meth)acrylate, sec-butyl(meth)acrylate, t-butyl(meth)acrylate, pentyl(meth)acrylate, isopentyl(meth) acrylate, neopentyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, isononyl(meth)acrylate, decyl(meth)acrylate, isodecyl (meth)acrylate, undecyl(meth)acrylate, and dodecyl(meth) acrylate. As the (meth)acrylic acid $C_{4-12}$ alkyl ester, n-butyl (meth)acrylate is particularly suitable.

The above-mentioned (meth)acrylic acid alkoxyalkyl ester is not particularly limited, and examples thereof include methoxyethyl(meth)acrylate, and ethoxyethyl(meth)acrylate.

The above-mentioned main monomer components can be used alone or as a combination of two or more thereof.

In the acrylic polymer (a), monomer proportion of at least one of the (meth)acrylic acid $C_{4-12}$ alkyl ester and the (meth) acrylic acid alkoxyalkyl ester as the main monomer components is 50% by weight or more, preferably 80% by weight or more, further preferably 90% by weight or more, based on the total amount of monomer components. In this connection, it is desirable that the upper limit of the above-mentioned proportion of the main monomer components is 99% by weight or less (particularly 97% by weight or less). When the proportion of the main monomer components is less than 50% by weight based on the total amount of the monomer components, it becomes impossible to obtain peeling strength and cohesive strength necessary as a pressure-sensitive adhesive. When both of the (meth)acrylic acid $C_{4-12}$ alkyl ester and (meth)acrylic acid alkoxyalkyl ester are contained as the monomer components, it is sufficient when the total amount of both of them satisfy the above-mentioned range.

Examples of the above-mentioned carboxyl group-containing monomer include (meth)acrylic acid, itaconic acid, maleic acid, fumaric acid, and crotonic acid. In addition, acid anhydrides of these carboxyl group-containing monomers (e.g., a monomer containing maleic anhydride, itaconic anhydride or the like acid anhydride) can also be used as the carboxyl group-containing monomer. These monomer components may be used alone or as a combination of two or more thereof.

In the acrylic polymer (a), a proportion of the carboxyl group-containing monomer is from 1 to 10 parts by weight, preferably from 3 to 8 parts by weight, based on 100 parts by weight of the total monomer components. When the above-mentioned proportion is less than 1 part by weight, proper adhesiveness for an adherend cannot be secured, and there is a case in which the transparency is reduced. On the other hand, when it is larger than 10 parts by weight, there is a case in which coating ability failure and the like problems occur due to increase in viscosity of the pressure-sensitive adhesive.

In the acrylic polymer (a), other monomer copolymerizable with the above-mentioned main monomer components and carboxyl group-containing monomer may be jointly used according to the necessity. In this connection, the proportion of such a copolymerizable other monomer can be optionally selected within a range of less than 40 parts by weight based on 100 parts by weight of total monomer components, depending on the kind of each monomer component. In order to effect expression of proper pressure-sensitive adhesiveness, it is desirably such a use amount that glass transition temperature of the acrylic polymer (a) becomes −20° C. or less (preferably from −70 to −35° C.).

Examples of the above-mentioned copolymerizable other monomer include (meth)acrylic acid alkyl esters containing an alkyl group having a number of carbons of from 1 to 3, such as methyl(meth)acrylate, ethyl(meth)acrylate, n-propyl (meth)acrylate, and isopropyl(meth)acrylate; (meth)acrylic acid alkyl esters having from 13 to 18 carbon atoms, such as tridecyl(meth)acrylate, and stearyl(meth)acrylate; functional monomers such as a hydroxyl group-containing monomer (e.g., hydroxyethyl(meth)acrylate, hydroxypropyl(meth) acrylate, hydroxybutyl(meth)acrylate or the like), an epoxy group-containing acrylic system monomer (e.g., glycidyl (meth)acrylate, methylglycidyl(meth)acrylate or the like), glycerol dimethacrylate, and 2-methacryloyloxyethyl isocyanate; multi-functional monomers such as triethylene glycol diacrylate, ethylene glycol dimethacrylate, and trimethylolpropane tri(meth)acrylate; (meth)acrylic acid cycloalkyl esters such as cyclohexyl(meth)acrylate and non-aromatic ring-containing (meth)acrylic acid esters such as isobornyl (meth)acrylate; aromatic ring-containing (meth)acrylic esters such as a (meth)acrylic acid aryl ester (e.g., phenyl (meth)acrylate or the like), a (meth)acrylic acid aryloxyalkyl ester (e.g., phenoxyethyl(meth)acrylate or the like), a (meth) acrylic acid arylalkyl ester (e.g., (meth)acrylic acid benzyl ester or the like); vinyl ester monomers such as vinyl acetate and vinyl propionate; styrenic monomers such as styrene, and α-methyl styrene; olefinic monomers such as ethylene, propylene, isoprene, and butadiene; and vinyl ether monomers such as vinyl ether.

The acrylic polymer (a) can be prepared by a conventionally known or commonly used polymerization method. As the polymerization method of acrylic polymer (a), for example, solution polymerization, emulsion polymerization, bulk polymerization, a polymerization method by ultraviolet ray irradiation and the like may be mentioned, of which solution polymerization is suitable in terms of the transparency, water resistance, cost and the like.

In this connection, an initiator, a chain transfer agent and the like to be used in carrying out polymerization of the acrylic polymer (a) are not particularly limited and can be used by optionally selecting from conventionally known or commonly used substances. More illustratively, preferable examples of the initiator include azo type initiators such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), 2,2'-azobis(methyl), and dimethyl-2,2'-azobis(2-methylpropionate); and oil soluble initiators such as peroxide type initiators, for example, benzoyl peroxide, t-butyl hydroperoxide, di-t-butyl peroxide, t-butyl peroxybenzoate, dicumyl peroxide, 1,1-bis(t-butylperoxy)3,3,5-trimethylcyclohexane, 1,1-bis(t-butylperoxy)cyclododecane. The initiator can be used alone or as a combination of two or more thereof. The amount of the initiator to be used may be a generally used amount and, for example, can be selected from the range of approximately from 0.01 to 1 part by weight based on 100 parts by weight of the total monomer components.

In this connection, various general solvents can be used in the solution polymerization. Examples of such solvents include organic solvents such as ethyl acetate, n-butyl acetate and the like esters; toluene, benzene and the like aromatic hydrocarbons; n-hexane, n-heptane and the like aliphatic hydrocarbons; cyclohexane, methylcyclohexane and the like alicyclic hydrocarbons; and methyl ethyl ketone, methyl isobutyl ketone and the like ketones. The solvents can be used alone or as a combination of two or more thereof.

According to the invention, the acrylic polymer (a) has a weight-average molecular weight of from 400,000 or more to 1,500,000 or less (from 400,000 to 1,500,000), preferably from 600,000 to 900,000, more preferably from 600,000 to 800,000. When the weight-average molecular weight of the acrylic polymer (a) is less than 400,000, it becomes impossible to exert pressure-sensitive adhesion strength and cohesive strength necessary as a pressure-sensitive adhesive, while when it exceeds 1,500,000, there is a case in which coating ability failure and the like problems occur due to increase in viscosity of the pressure-sensitive adhesive.

In this connection, according to the invention, weight-average molecular weights (Mw) of the acrylic polymer (a) and the acrylic oligomer (b) which is described in the following can be measured by a gel permeation chromatography (GPC). More illustratively, it can be calculated from a polystyrene-concerted value by measuring it using "HLC-8120 GPC" (trade name, mfd. by TOSOH CORPORATION) as the GPC measuring apparatus under the following GPC measuring conditions.

GPC Measuring Conditions
Sample concentration: 0.2% by weight (tetrahydrofuran solution)
Sample injection: 10 μl
Eluent: tetrahydrofuran (THF)
Quantity of flow (flow rate): 0.6 ml/min
Column temperature (measuring temperature): 40° C.
Column: trade name "TSKgel Super HM-H/H4000/H3000/H2000" (mfd. by TOSOH CORPORATION)
Detector: differential refractometer (RI)

The weight-average molecular weight of the acrylic polymer (a) can be controlled by the kinds of initiator and chain transfer agent, use amounts thereof and temperature and period of time during polymerization, as well as monomer concentration, monomer dropping rate and the like.

Acrylic Oligomer (b)

The acrylic oligomer (b) to be used in the pressure-sensitive adhesive composition of the invention is a polymer containing a general (meth)acrylic acid ester as a main monomer component. As the (meth)acrylic acid ester to be used as the aforementioned main monomer component, a (meth)acrylic acid alkyl ester, a (meth)acrylic acid alkoxyalkyl ester and a (meth)acrylic acid ester having a ring structure in the molecule thereof are preferable. In addition to the above-mentioned main monomer component, the acrylic oligomer (b) contains a carboxyl group-containing monomer as an essential copolymerization monomer component. In addition, other monomer components may further be used according to the necessity.

As the above-mentioned (meth)acrylic acid alkyl ester, for example, the aforementioned (meth)acrylic acid $C_{4-12}$ alkyl ester exemplified as the main monomer component of the acrylic polymer (a) can be preferably used. In addition, as the above-mentioned (meth)acrylic acid alkoxyalkyl ester, the aforementioned (meth)acrylic acid alkoxyalkyl ester exemplified as the main monomer component of the acrylic polymer (a) can be preferably used.

Particularly, from the viewpoint of obtaining foaming and separation resistances with respect to transparent plastics such as acrylic resin and polycarbonate resin under a severe condition (high-temperature and high-humidity condition), among the above-mentioned main monomer components, a (meth)acrylic acid ester having a ring structure in the molecule thereof is preferable, and particularly preferable is a (meth)acrylic acid ester which has a ring structure in the molecule thereof and shows a glass transition temperature (Tg) of from 60 to 190° C. when it is formed into a homopolymer.

As the ring in the above-mentioned (meth)acrylic acid ester which has a ring structure in the molecule thereof and shows a Tg value of from 60 to 190° C. when it is formed into a homopolymer, it may be either an aromatic ring or a non-aromatic ring, but a non-aromatic ring is preferable. In this connection, examples of the aforementioned aromatic ring include an aromatic hydrocarbon ring (e.g., benzene ring or a condensed carbon ring in naphthalene or the like), and various aromatic hetero rings. In addition, examples of the aforementioned non-aromatic ring include non-aromatic alicyclic rings (e.g., cycloalkane rings such as cyclopentane ring, cyclohexane ring, cyclopentane ring, and cyclooctane ring; cycloalkene rings such as cyclohexene ring), and non-aromatic bridged rings (e.g., bicyclic hydrocarbon rings in pinane, pinene, bornane, norbornane, norbornene and the like; tricyclic hydrocarbon rings in adamantane and the like, as well as tetracyclic hydrocarbon rings and the like bridged type hydrocarbon rings and the like).

As such a (meth)acrylic acid ester which has a ring structure in the molecule thereof and shows a Tg value of from 60 to 190° C. when it is formed into a homopolymer, (meth)acrylic acid cycloalkyl esters such as (meth)acrylate, non-aromatic ring-containing (meth)acrylic acid esters such as isobornyl(meth)acrylate and the like are preferable, and illustratively, cyclohexyl methacrylate and isobornyl(meth)acrylate can be preferably exemplified.

In the acrylic oligomer (b), the above-mentioned main monomer component is contained in a proportion of 50% by weight or more, preferably 80% by weight or more, more preferably 90% by weight or more, based on the total amount of the monomer components. In this connection, upper limit of the proportion based on the total amount of the monomer components is 99% by weight or less, preferably 97% by weight or less. In this connection, the above-mentioned main monomer component can be used alone or as a combination of two or more thereof.

In addition, a carboxyl group-containing monomer is used in the acrylic oligomer (b) as an essential copolymerization monomer component. As such a carboxyl group-containing monomer, similar to the case of the carboxyl group-containing monomer in the aforementioned acrylic polymer (a), for example, (meth)acrylic acid, itaconic acid, maleic acid, fumaric acid, crotonic acid and the like may be mentioned. In addition, acid anhydrides of these carboxyl group-containing monomers (e.g., a monomer containing maleic anhydride, itaconic anhydride or the like acid anhydride) can also be used as the carboxyl group-containing monomer.

In the acrylic oligomer (b), a proportion of the above-mentioned carboxyl group-containing monomer is from 1 to 10 parts by weight, preferably from 3 to 8 parts by weight, based on 100 parts by weight of the total monomer components constituting the acrylic oligomer (b). When the proportion of carboxyl group-containing monomer is less than 1 part by weight, there is a tendency that the transparency is reduced and the viscosity of the pressure-sensitive adhesive composition is increased in some cases.

On the other hand, when it exceeds 10 parts by weight, there is a tendency that temperature control during polymerization becomes difficult, so that both cases are not preferable.

In this connection, in addition to the above-mentioned monomer component, other copolymerizable monomer may be jointly used in the acrylic oligomer (b) according to the necessity. As such other copolymerizable monomer, the monomer components other than the above-mentioned main monomer components and carboxyl group-containing monomers, which were exemplified as the other copolymerizable monomer in the above-mentioned acrylic polymer (a), can be used.

The glass transition temperature (Tg) of the acrylic oligomer (b) is preferably 60° C. or more, more preferably from 65 to 180° C. When the glass transition temperature of the acrylic oligomer (b) is less than 60° C., adhesiveness of the pressure-sensitive adhesive is reduced and, as a result, properties of preventing float or separation are reduced in some cases. In this connection, the glass transition temperature (Tg) of a copolymer is a glass transition temperature represented by the following formula (theoretical value).

$$1/Tg = W_1/Tg_1 + W_2/Tg_2 + \ldots + W_n/Tg_n$$

In the above formula, Tg is a glass transition temperature (unit: K) of a copolymer, $Tg_n$ is a glass transition temperature (unit: K) of a homopolymer of monomer n, and $W_n$ is a weight fraction of monomer n.

The acrylic oligomer (b) can be prepared by a conventionally known or commonly used polymerization method. As the polymerization method of acrylic oligomer (b), for example, similar to the case of the aforementioned polymerization method of acrylic polymer (a), solution polymerization, emulsion polymerization, bulk polymerization, a polymerization method by ultraviolet ray irradiation and the like may be mentioned, of which solution polymerization is suitable in terms of the transparency, water resistance, cost and the like.

In this connection, regarding the initiator, solvent and the like to be used in carrying out polymerization of the acrylic oligomer (b), it is possible to use the same substances used in the above-mentioned acrylic polymer (a). The amount of the initiator to be used may be a general use amount and can be selected for example from a range of approximately from 0.1 to 15 parts by weight based on 100 parts by weight of the total monomer components.

In addition, a chain transfer agent may be used in the acrylic oligomer (b) for the purpose of controlling the molecular weight. Examples of the chain transfer agent include 2-mercaptoethanol, laurylmercaptan, glycidylmercaptan, mercaptoacetic acid, 2-ethylhexyl thioglycolate, 2,3-dimethylmercapto-1-propanol, and α-methylstyrene dimer.

As the amount of the chain transfer agent to be used, for example, approximately from 0.01 to 15 parts by weight based on 100 parts by weight of the total monomer components is preferable.

Weight-average molecular weight of the acrylic oligomer (b) is 3,000 or more but less than 6,000, preferably from 3,300 to 5,500, more preferably from 3,500 to 5,000. The weight-average molecular weight can be controlled by the kinds of initiator and chain transfer agent, use amounts thereof and temperature and period of time during polymerization, as well as monomer concentration, monomer dropping rate and the like.

Pressure-Sensitive Adhesive Composition

According to the pressure-sensitive adhesive composition of the invention, blending proportion of the acrylic oligomer (b) is from 10 to 35 parts by weight, preferably from 15 to 30 parts by weight, based on 100 parts by weight of the acrylic polymer (a). When the blending proportion of the acrylic oligomer (b) is less than 10 parts by weight based on 100 parts by weight of the acrylic polymer (a), effect of the addition of acrylic oligomer (b) can be hardly exerted, while when it exceeds 35 parts by weight, it is not preferable since it greatly exerts influence upon the adhesion characteristics by the acrylic polymer (a).

The pressure-sensitive adhesive composition of the invention contains the acrylic polymer (a) and acrylic oligomer (b) by a specified blending proportion. Accordingly, the pressure-sensitive adhesive layer containing the pressure-sensitive adhesive composition has an excellent transparency. In addition, since it is excellent in both cohesive strength (drag against shear force) and adhesiveness (vertical direction drag at the interface), it is also excellent in foaming and separation resistances because, for example when it is used by laminating with a plastic substrate, float and separation are not generated at the adhesion interface due to generated babbles (foaming) from the substrate.

In addition, the pressure-sensitive adhesive composition of the invention contains a silane coupling agent having an amino group. The silane coupling agent having an amino group is not particularly limited, and preferable examples thereof include 3-aminopropyltrimethoxysilane, 3-aminopropyltriethoxysilane, N-(2-aminoethyl) 3-aminopropylmethyldimethoxysilane, N-(2-aminoethyl) 3-aminopropyltrimethoxysilane, N-(2-aminoethyl) 3-aminopropyltriethoxysilane, γ-anilinopropyltrimethoxysilane, and γ-anilinopropyltriethoxysilane. Particularly, a silane coupling agent having a secondary amine is preferable. The adding amount of the above-mentioned silane coupling agent having an amino group is 0.01 part by weight or more but less than 1.0 part by weight, preferably from 0.03 to 0.5 part by weight, more preferably from 0.03 to 0.3 part by weight, based on 100 parts by weight of the acrylic polymer (a). When the adding amount is less than 0.01 part by weight, adding effect of the silane coupling agent becomes insufficient, while in the case of 1.0 part by weight or more, there is a case in which yellowing at the time of heat preservation becomes considerable.

According to the invention, although the minute action mechanism is not clear, it is considered that when the acrylic oligomer having a carboxyl group and the silane coupling agent having an amino group are added to the pressure-sensitive adhesive composition, the amino group and carboxyl group interact with each other and exert excellent adhesiveness to glass and preservation stability. That is, the adhesiveness to glass is improved due to the effect of the amino group and the effect of the silane coupling agent. In addition, it is considered that, although the preservation stability is reduced due to generation of hydrolysis when the silane coupling agent alone is added, when the silane coupling agent interacts with the acrylic oligomer, the hydrolyzing rate becomes slow and the dimerization and trimerization becomes difficult to occur, so that the above-mentioned effect of the silane coupling agent continues over a prolonged period of time.

The pressure-sensitive adhesive composition of the invention contains a cross-linking agent. According to the invention, the cohesive strength as a pressure-sensitive adhesive can be further increased by cross-linking the acrylic polymer (a) and acrylic oligomer (b) using the cross-linking agent. Those which are conventionally known as a cross-linking agent may be broadly employed. Preferable examples of the cross-linking agent include a multifunctional melamine compound, a multifunctional epoxy compound and a multifunctional isocyanate compound. The cross-linking agent can be used alone or as a mixture of two or more thereof.

Examples of the above-mentioned multifunctional melamine compound include methylated trimethylolmelamine, and butylated hexamethylolmelamine. Further, examples of the multifunctional epoxy compound include diglycidylaniline, and glycerol diglycidyl ether. Furthermore, examples of the multifunctional isocyanate compound include tolylene diisocyanate, hexamethylene diisocyanate, polymethylenepolyphenyl isocyanate, diphenylmethane diisocyanate, a reaction product of trimethylolpropane with tolylene diisocyanate, a polyether polyisocyanate, and a polyester polyisocyanate.

The use amount of the above-mentioned cross-linking agent is not particularly limited, and generally, it is preferably from 0.01 to 20 parts by weight based on 100 parts by weight of the acrylic polymer (a).

In addition to the above-mentioned acrylic polymer (a), acrylic oligomer (b), silane coupling agent having an amino group and cross-linking agent, the pressure-sensitive adhesive composition of the invention may optionally contain other general additive agents, such as an ultraviolet ray absorbent, an antioxidant, a light stabilizer, an age resistor, a separation adjusting agent, a tackifier, a plasticizer, a softening agent, a filler, a coloring agent (a pigment, dyestuff or the like), a surfactant, and an antistatic agent.

The pressure-sensitive adhesive composition of the invention can be prepared by mixing the acrylic polymer (a), acrylic oligomer (b), silane coupling agent having an amino group, cross-linking agent and optional other additive agents.

Pressure-Sensitive Adhesive Product

A pressure-sensitive adhesive product is obtained by applying the above-mentioned pressure-sensitive adhesive composition of the invention onto a base material or a release liner to form a pressure-sensitive adhesive layer. The pressure-sensitive adhesive product of the invention includes, for example, a pressure-sensitive adhesive sheet, and a pressure-sensitive adhesive tape. The pressure-sensitive adhesive product of the invention may be in the form of a sheet or tape having no base material (base material-free) prepared by coating the above-mentioned pressure-sensitive adhesive composition on a release liner, or in the form of a sheet or tape in which a pressure-sensitive adhesive layer formed from the pressure-sensitive adhesive composition of the invention is disposed on one side or both sides of a base material.

The thickness of the above-mentioned pressure-sensitive adhesive layer (thickness after coating and drying of the pressure-sensitive adhesive composition) is not particularly limited, and for example, it is preferably from 5 to 1,000 μm, more preferably from 10 to 100 μm. In this connection, the pressure-sensitive adhesive layer may have a form of either a single layer or a layered product.

When the above-mentioned pressure-sensitive adhesive layer is disposed on a base material, the base material is not particularly limited, and examples thereof include various optical films such as a plastic film, an antireflection (AR) film, a polarizing plate, and a phase difference plate. As the raw material of the above-mentioned plastic film and the like, for example, polyethylene terephthalate (PET) and the like polyesters, polymethyl methacrylate (PMMA) and the like acrylic system resins, polycarbonate, triacetyl cellulose, polysulfone, polyarylate, trade name "ARTON (a cyclic olefin system polymer; mfd. by JSR)", trade name "ZEONOR (a cyclic olefin system polymer; mfd. by Nippon Zeon)" and the like plastic materials may be mentioned. In this connection, the plastic materials can be used alone or as a combination of two or more thereof. The thickness of the above-mentioned base material is not particularly limited, and for example, it is preferably from 10 to 1,000 μm. In this connection, the above-mentioned base material may have a form of either a single layer or a layered product. In addition, an optional conventionally known or generally used surface treatment, such as corona discharge treatment, plasma treatment or the like physical treatment or undercoating treatment or the like chemical treatment, may be applied to the base material surface.

In this connection, it is possible to use a conventionally known application method for the application of the pressure-sensitive adhesive composition in producing the pressure-sensitive adhesive product of the invention, and a generally used coater such as gravure roll coater, reverse roll coater, kiss roll coater, dip roll coater, bar coater, knife coater, spray coater or the like can be used.

When the pressure-sensitive adhesive product of the invention is used in a display or the like, it is desirable that the pressure-sensitive adhesive product has a high transparency, and for example, it is desirable that it has a transparency as a total light transmittance in visible light wavelength region (in accordance with JIS K 7361) of 85% or more (preferably 90% or more, more preferably 95% or more).

In addition, it is desirable that the pressure-sensitive adhesive product (a pressure-sensitive adhesive sheet or the like) has a haze value (in accordance with JIS K 7136) of, for example, less than 1.0%.

The adherend of the above-mentioned pressure-sensitive adhesive product (pressure-sensitive adhesive sheet or pressure-sensitive adhesive tape) is not particularly limited, and an acrylic resin plate, a polycarbonate plate, glass, polyethylene terephthalate and the like may be exemplified.

The pressure-sensitive adhesive product of the invention is suitably used in the display of a plasma display panel (PDP), a touch panel, a liquid crystal panel and the like.

EXAMPLES

The following describes the invention further in detail based on examples, but the invention is not restricted by these examples.

Acrylic Polymer Preparation Example 1

A 96 parts by weight portion of butyl acrylate and 4 parts by weight of acrylic acid as the monomer components, 0.2 part by weight of 2,2'-azobisisobutyronitrile as the initiator and 185.7 parts by weight of ethyl acetate as the polymerization solvent were put into a separable flask and stirred for 1 hour while introducing nitrogen gas.

After removing oxygen from the polymerization system in this manner, the contents were heated up to 63° C. and allowed to undergo the reaction for 10 hours, and then toluene was added thereto to obtain an acrylic polymer solution having a solid concentration of 25% by weight (to be referred sometimes to as "acrylic polymer solution A" hereinafter). Weight-average molecular weight of the acrylic polymer(to be referred sometimes to as "polymer A" hereinafter) in the acrylic polymer solution A was 850,000.

Acrylic Polymer Preparation Example 2

An acrylic polymer solution having a solid concentration of 25% by weight (to be referred sometimes to as "acrylic polymer solution B" hereinafter) was obtained in the same manner as in Acrylic polymer preparation example 1, except that 95 parts by weight of 2-ethylhexyl acrylate and 5 parts by weight of acrylic acid were used as the monomer components, and 0.2 part by weight of 2,2'-azobisisobutyronitrile as the initiator and 233.3 parts by weight of ethyl acetate as the polymerization solvent. Weight-average molecular weight of the acrylic polymer (to be referred sometimes to as "polymer B" hereinafter) in the acrylic polymer solution B was 800,000.

Acrylic Polymer Preparation Example 3

An acrylic polymer solution having a solid concentration of 25% by weight (to be referred sometimes to as "acrylic polymer solution C" hereinafter) was obtained in the same manner as in Acrylic polymer preparation example 1, except that 100 parts by weight of butyl acrylate was used as the monomer component, and 0.2 part by weight of 2,2'-azobisisobutyronitrile as the initiator and 233.3 parts by weight of ethyl acetate as the polymerization solvent. Weight-average molecular weight of the acrylic polymer (to be referred sometimes to as "polymer C" hereinafter) in the acrylic polymer solution C was 750,000.

Acrylic Polymer Preparation Example 4

An acrylic polymer solution having a solid concentration of 25% by weight (to be referred sometimes to as "acrylic polymer solution D" hereinafter) was obtained in the same manner as in Acrylic polymer preparation example 1, except that 88 parts by weight of butyl acrylate and 12 parts by weight of acrylic acid were used as the monomer components, and 0.2 part by weight of 2,2'-azobisisobutyronitrile as the initiator and 233.3 parts by weight of ethyl acetate as the polymerization solvent. Weight-average molecular weight of the acrylic polymer (to be referred sometimes to as "polymer D" hereinafter) in the acrylic polymer solution D was 800,000.

Oligomer Preparation Example 1

A 95 parts by weight portion of cyclohexyl methacrylate (glass transition temperature of homopolymer (cyclohexyl polymethacrylate): 66° C.) and 5 parts by weight of acrylic acid as the monomer components, 10 parts by weight of α-methylstyrene dimer as the chain transfer agent, 10 parts by weight of 2,2'-azobisisobutyronitrile as the initiator and 120 parts by weight of toluene as the polymerization solvent were put into a separable flask and stirred for 1 hour while introducing nitrogen gas. After removing oxygen from the polymerization system in this manner, the contents were heated up to 85° C. and allowed to undergo the reaction for 5 hours to obtain an acrylic oligomer solution having a solid concentration of 50% by weight (to be referred sometimes to as "acrylic oligomer solution E" hereinafter). Weight-average molecular weight of the acrylic oligomer (to be referred sometimes to as "acrylic oligomer E" hereinafter) in the acrylic oligomer solution E was 4,000.

Oligomer Preparation Example 2

An acrylic oligomer solution having a solid concentration of 50% by weight (to be referred sometimes to as "acrylic oligomer solution F" hereinafter) was obtained in the same manner as in Oligomer preparation example 1, except that 100 parts by weight of methyl methacrylate (glass transition temperature of homopolymer (methyl polymethacrylate): 105° C.) was used as the monomer component. Weight-average molecular weight of the acrylic oligomer (to be referred sometimes to as "acrylic oligomer F" hereinafter) in the acrylic oligomer solution F was 4,000.

Inventive Example 1

A pressure-sensitive adhesive solution was prepared by mixing 100 parts by weight (as solid content) of the acrylic polymer solution A with 25 parts by weight (as solid content) of the acrylic oligomer solution E, 0.05 part by weight of 3-aminopropyltrimethoxysilane ("KBM 903", mfd. by Shin-Etsu-Chemical Co., Ltd.) and 0.05 part by weight (as solid content) of a tetra-functional epoxy system cross-linking agent (trade name "TETRAD-C", mfd. by Mitsubishi Gas Chemical Company, Inc.) at that ratios. This pressure-sensitive adhesive solution was spread and coated on the surface lubrication-treated side of a polyethylene terephthalate (PET)

film (38 μm in thickness) in which a surface lubrication treatment had been applied to one side thereof, dried by heating at 130° C. for 3 minutes and further subjected to aging at 50° C. for 72 hours, thereby preparing a pressure-sensitive adhesive sheet (base material-less type).

Inventive Example 2

A pressure-sensitive adhesive sheet was prepared in the same manner as in Inventive Example 1, except that adding amount of 3-aminopropyltrimethoxysilane (KBM 903) was changed to 0.3 part by weight.

Inventive Example 3

A pressure-sensitive adhesive sheet was prepared in the same manner as in Inventive Example 1, except that the acrylic polymer solution A was changed to the acrylic polymer solution B. In this connection, blending amount (adding amount) of each component of the acrylic polymer, acrylic oligomer and silane coupling agent is as shown in Table 1; the same shall apply hereinafter.

Comparative Example 1

A pressure-sensitive adhesive sheet was prepared in the same manner as in Inventive Example 1, except that 0.1 part by weight of γ-glycidoxypropyltrimethoxysilane ("KBM 403", mfd. by Shin-Etsu Chemical Co., Ltd.) was used as the silane coupling agent.

Comparative Example 2

A pressure-sensitive adhesive solution was prepared in the same manner as in Inventive Example 1, except that the acrylic oligomer solution E was not added. Since coating ability of this pressure-sensitive adhesive solution was poor due to increase of its viscosity, a pressure-sensitive adhesive sheet could not be prepared.

Comparative Example 3

A pressure-sensitive adhesive solution was prepared in the same manner as in Inventive Example 1, except that the acrylic oligomer E was changed to 20 parts by weight (as solid content) of the acrylic oligomer F. Since coating ability of this pressure-sensitive adhesive solution was poor due to increase of its viscosity, a pressure-sensitive adhesive sheet could not be prepared.

Comparative Example 4

A pressure-sensitive adhesive sheet was prepared in the same manner as in Inventive Example 1, except that the acrylic polymer solution A was changed to the acrylic polymer solution C.

Comparative Example 5

A pressure-sensitive adhesive sheet was prepared in the same manner as in Inventive Example 1, except that adding amount of 3-aminopropyltrimethoxysilane (KBM 903) was changed to 1 part by weight.

Comparative Example 6

A pressure-sensitive adhesive sheet was prepared in the same manner as in Inventive Example 1, except that the acrylic polymer solution A was changed to the acrylic polymer solution D.

Comparative Example 7

A pressure-sensitive adhesive sheet was prepared in the same manner as in Inventive Example 1, except that 3-aminopropyltrimethoxysilane (KBM 903) was not added.

Evaluation

Coating ability, transparency, adhesiveness (adhesion strength after humidification) and change in color tone by high temperature preservation were evaluated by the following measuring methods or evaluation methods, on the pressure-sensitive adhesive solutions and pressure-sensitive adhesive sheets obtained in Inventive Examples 1 to 3 and Comparative Examples 1 to 7. In this connection, the evaluation results are shown in Table 1.

(1) Coating Ability

When pressure-sensitive adhesive sheets were prepared by spreading and coating the pressure-sensitive adhesive solutions obtained in Inventive Examples and Comparative Examples on a surface lubrication-treated PET film at a coating rate of from 1 to 10 m/min., those which showed smooth coated side without generating coating stripes were judged as good coating ability (good), and those in which coating stripes and the like were generated and the coated side did not become smooth were judged as poor coating ability (poor). In this connection, the judgment was carried out visually.

(2) Transparency (Haze Value)

A test piece having a layer construction of pressure-sensitive adhesive layer/slide glass was prepared by laminating each of the pressure-sensitive adhesive sheets obtained in Inventive Examples and Comparative Examples on a slide glass (mfd. by Matsunami Glass, trade name "S-1111", haze value 0.4%) and then peeling off the PET film, and the haze value (%) of the test piece was measured using a haze meter (mfd. by Murakami Color Research Laboratory, trade name "HM-150"). In this connection, the haze value (%) was calculated a formula of "diffuse transmittance/total light transmittance×100".

The transparency is good when the haze value is less than 1.0%, and is poor when it exceeds 1.0%.

(3) Adhesion Strength After Humidification (Just After Preparation)

A test piece of 25 mm in width and 120 mm in length was prepared by laminating each of the pressure-sensitive adhesive sheets obtained in Inventive Examples and Comparative Examples on a PET film having an easy adhesion-treated surface (mfd. by Toyobo Co., Ltd., trade name "A 4100", 125 μm in thickness).

The surface lubrication-treated PET film was peeled of from this test piece and laminated on a side, which is not the tin-contacting side, of soda lime glass having a thickness of 2 mm (mfd. by Matsunami Glass, article number S), by one reciprocation of a roller of 19.6 N in weight and 45 mm in width in an atmosphere of 23° C. in accordance with JIS Z-0237. The laminated sample prepared in this manner was allowed to stand under an environment of (i) 50° C., 24 hours, (ii) 60° C., 95% RH, 250 hours or (iii) 23° C., 50% RH, 2 hours. Thereafter, adhesion strength (N/25 mm) was measured and regarded as the "adhesion strength after humidification (just after preparation)", by carrying out the 90° peeling test at an elastic stress rate of 300 mm/min in accordance with JIS Z-0237 using a TENSIRON peeling tester. In this connection, in the above-mentioned (i), temperature was changed from the condition of 23°, 50% RH, without controlling humidity.

(4) Adhesion Strength After Humidification (After High-Temperature Preservation, After High-Temperature and High-Humidity Preservation)

Each of the pressure-sensitive adhesive sheets obtained in Inventive Examples and Comparative Examples was preserved under an environment of 60° C. (humidity was not controlled similar to the case of the above-mentioned (i)) for 30 days to prepare a sample after high temperature preservation. Using the sample, the treatment of (i) to (iii) was applied thereto in the same manner as in the above-mentioned (3), and then the adhesion strength was measured and regarded as the "adhesion strength after humidification (after high-temperature preservation)".

In addition, by changing the preservation environment to 40° C., 92% RH, and preserving for 30 days in the same manner as in the above, a sample after high temperature high humidity preservation was prepared. Using the sample, the treatment of (i) to (iii) was applied thereto in the same manner as in the above-mentioned (3), and then the adhesion strength was measured and regarded as the "adhesion strength after humidification (after high-temperature and high-humidity preservation)".

(5) Change in Color Tone During High-Temperature Preservation

Each of the pressure-sensitive adhesive sheets obtained in Inventive Examples and Comparative Examples was preserved for 1,000 hours under an environment of 80° C. (humidity was not controlled similar to the case of the above-mentioned (i)).

Thereafter, a test piece having a layer construction of pressure-sensitive adhesive layer/slide glass was prepared by laminating said pressure-sensitive adhesive sheet on a slide glass (mfd. by Matsunami Glass, trade name "S-1111", haze value 0.4%) and then peeling off the PET film.

Using "DOT-3C" manufactured by Murakami Color Research Laboratory, the b value of Lab colorimetric system was measured. In this connection, it was judged good ( ) when the b value was less than 0.5.

TABLE 1

|  |  |  | Inv. Ex. 1 | Inv. Ex. 2 | Inv. Ex. 3 | Comp. Ex. 1 | Comp. Ex. 2 |
|---|---|---|---|---|---|---|---|
| Acrylic polymer (a) | Monomer composition | Main monomer component | BA | BA | 2EHA | BA | BA |
|  |  | Copolymerization component | AA | AA | AA | AA | AA |
|  | Monomer ratio (main component/copolymerization component) (weight ratio) |  | 96/4 | 96/4 | 95/5 | 96/4 | 96/4 |
|  | Weight-average molecular weight |  | 850,000 | 850,000 | 800,000 | 850,000 | 850,000 |
| Acrylic oligomer (b) | Monomer composition | Main monomer component | CHMA | CHMA | CHMA | CHMA | — |
|  |  | Copolymerization component | AA | AA | AA | AA | — |
|  | Monomer ratio (main component/copolymerization component) (weight ratio) |  | 95/5 | 95/5 | 95/5 | 95/5 | — |
|  | Weight-average molecular weight |  | 4000 | 4000 | 4000 | 4000 | — |
|  | Adding amount (weight parts based on 100 weight parts of polymer (a)) |  | 25 | 25 | 25 | 25 | — |
| Silane coupling agent | Kind |  | KBM 903 | KBM 903 | KBM 903 | KBM 403 | KBM 903 |
|  | Adding amount (weight parts based on 100 weight parts of polymer (a)) |  | 0.05 | 0.3 | 0.1 | 0.1 | 0.1 |
|  | Transparency (haze value) (%) |  | 0.6 | 0.6 | 0.6 | 0.6 | — |
|  | Adhesion strength after humidification | Just after preparation | 17 | 18 | 19 | 17 | — |
|  |  | After high-temperature preservation | 17 | 17 | 18 | 4.7 | — |
|  |  | After high-temperature and high-humidity preservation | 17 | 17 | 17 | 3.9 | — |
|  | Change in color tone during high-temperature preservation |  | 0.27 | 0.34 | 0.30 | 0.21 | — |
|  | Coating ability |  | Good | Good | Good | Good | Poor (increase of viscosity) |

|  |  |  | Comp. Ex. 3 | Comp. Ex. 4 | Comp. Ex. 5 | Comp. Ex. 6 | Comp. Ex. 7 |
|---|---|---|---|---|---|---|---|
| Acrylic polymer (a) | Monomer composition | Main monomer component | BA | BA | BA | BA | BA |
|  |  | Copolymerization component | AA | — | AA | AA | AA |
|  | Monomer ratio (main component/copolymerization component) (weight ratio) |  | 96/4 | 100/0 | 96/4 | 88/12 | 96/4 |
|  | Weight-average molecular weight |  | 850,000 | 750,000 | 850,000 | 800,000 | 850,000 |
| Acrylic oligomer (b) | Monomer composition | Main monomer component | MMA | CHMA | CHMA | CHMA | CHMA |
|  |  | Copolymerization component | — | AA | AA | AA | AA |
|  | Monomer ratio (main component/copolymerization component) (weight ratio) |  | 100/0 | 95/5 | 95/5 | 95/5 | 95/5 |
|  | Weight-average molecular weight |  | 4000 | 4000 | 4000 | 4000 | 4000 |
|  | Adding amount (weight parts based on 100 weight parts of polymer (a)) |  | 20 | 20 | 25 | 25 | 25 |
| Silane coupling agent | Kind |  | KBM 903 | KBM 903 | KBM 903 | KBM 903 | — |
|  | Adding amount (weight parts based on 100 weight parts of polymer (a)) |  | 0.3 | 0.1 | 1.0 | 0.1 | — |
|  | Transparency (haze value) (%) |  | — | 5.7 | 0.6 | 0.6 | 0.6 |
|  | Adhesion strength after humidification | Just after preparation | — | 10 | 19 | 22 | 3 |
|  |  | After high-temperature preservation | — | 9 | 19 | 17 | 3 |

TABLE 1-continued

|  |  |  |  |  |  |
|---|---|---|---|---|---|
| After high-temperature and high-humidity preservation | — | 7 | 19 | 18 | 3 |
| Change in color tone during high-temperature preservation | — | 0.30 | 0.70 | 0.30 | 0.20 |
| Coating ability | Poor (increase of viscosity) | Good | Good | Poor (increase of viscosity) | Good |

BA: butyl acrylate
2EHA: 2-ethylhexyl acrylate
AA: acrylic acid
CHMA: cyclohexyl methacrylate
MMA: methyl methacrylate As is evident from Table 1, the pressure-sensitive adhesive compositions which satisfy the prescriptions of the invention are excellent in coating ability, and the pressure-sensitive adhesive layers and pressure-sensitive adhesive tapes formed by the pressure-sensitive adhesive compositions are excellent in transparency and adhesive property. In addition, even after long-term preservation under a high-temperature environment or high-temperature and high-humidity environment, they show no problems in terms of the periodical change in adhesion strength, coloring and the like (Inventive Examples).

On the other hand, in the case of the use of a silane coupling agent which does not have an amino group (Comparative Example 1), its adhesion strength after humidification is reduced when preserved for a prolonged period of time under a high-temperature environment or high-temperature and high-humidity environment. Also, in the case that no acrylic oligomer is added (Comparative Example 2) or in the case that the acrylic oligomer does not have a carboxyl group (Comparative Example 3), the pressure-sensitive adhesive composition causes increase in viscosity and the coating ability is markedly reduced. Also, when the acrylic polymer does not have a carboxyl group (Comparative Example 4), compatibility of the polymer with the oligomer is poor so that its transparency is reduced. In addition, when the content of carboxyl group-containing monomer in the acrylic polymer is excess (Comparative Example 6), viscosity of the pressure-sensitive adhesive composition becomes so high that the coating ability is reduced. In this connection, adhesion strength with respect to glass cannot be obtained when silane coupling agent is not added (Comparative Example 7), and in the case of that the silane coupling agent is added excessively (Comparative Example 5), a problem of coloring occurs when preserved for a prolonged period of time under high-temperature environment.

While the present invention has been described in detail and with reference to specific embodiments thereof, it will be apparent to one skilled in the art that various changes and modifications can be made therein without departing from the scope thereof.

This application is based on Japanese patent application No. 2007-123918 filed on May 8, 2007, the entire contents thereof being hereby incorporated by reference.

Further, all references cited herein are incorporated in their entireties.

What is claimed is:

1. A pressure-sensitive adhesive composition comprising an acrylic polymer (a), an acrylic oligomer (b), a silane coupling agent having an amino group, and a cross-linking agent,
said acrylic polymer (a) containing, as a main monomer component, at least one of a (meth)acrylic acid alkyl ester containing an alkyl group having a number of carbons of from 4 to 12 and a (meth)acrylic acid alkoxyalkyl ester, and containing 1 to 10 parts by weight of a carboxyl group-containing monomer as a monomer component based on 100 parts by weight of the total monomer components constituting the acrylic polymer (a), the acrylic polymer (a) having a weight-average molecular weight of from 400,000 to 1,500,000; and
said acrylic oligomer (b) containing a (meth)acrylic acid ester as a main monomer component, and containing 1 to 10 parts by weight of a carboxyl group-containing monomer as a monomer component based on 100 parts by weight of the total monomer components constituting the acrylic oligomer (b), the acrylic oligomer (b) having a weight-average molecular weight of 3,000 or more but less than 6,000,
wherein the pressure-sensitive adhesive composition contains 10 to 35 parts by weight of the acrylic oligomer (b) and 0.01 part by weight or more but less than 1.0 part by weight of the silane coupling agent having an amino group, based on 100 parts by weight of the acrylic polymer (a).

2. The pressure-sensitive adhesive composition according to claim 1, wherein said at least one of the (meth)acrylic acid alkyl ester and the (meth)acrylic acid alkoxyalkyl ester in the acrylic polymer (a) are contained in a proportion of 50% by weight or more based on the total amount of the monomer components constituting the acrylic polymer (a).

3. The pressure-sensitive adhesive composition according to claim 1, wherein the (meth)acrylic acid ester in the acrylic oligomer (b) is contained in a proportion of 50% by weight or more based on the total amount of the monomer components constituting the acrylic oligomer (b).

4. The pressure-sensitive adhesive composition according to claim 1, wherein the (meth)acrylic acid ester as the main monomer component constituting the acrylic oligomer (b) is a (meth)acrylic acid showing a glass transition temperature of from 60 to 190° C. when it is formed into a homopolymer.

5. The pressure-sensitive adhesive composition according to claim 1, wherein the (meth)acrylic acid ester as the main monomer component constituting the acrylic system oligomer (b) is a (meth)acrylic acid ester having a ring structure.

6. The pressure-sensitive adhesive composition according to claim 1, wherein the silane coupling agent has a secondary amine.

7. A pressure-sensitive adhesive product applied with the pressure-sensitive adhesive composition according to claim 1.

8. The pressure-sensitive adhesive product according to claim 7, wherein the pressure-sensitive adhesive composition is applied onto a base material or a release liner to form a pressure-sensitive adhesive layer.

9. A display obtained by laminating the pressure-sensitive adhesive product according to claim 7 on a glass.

* * * * *